Figure 1:
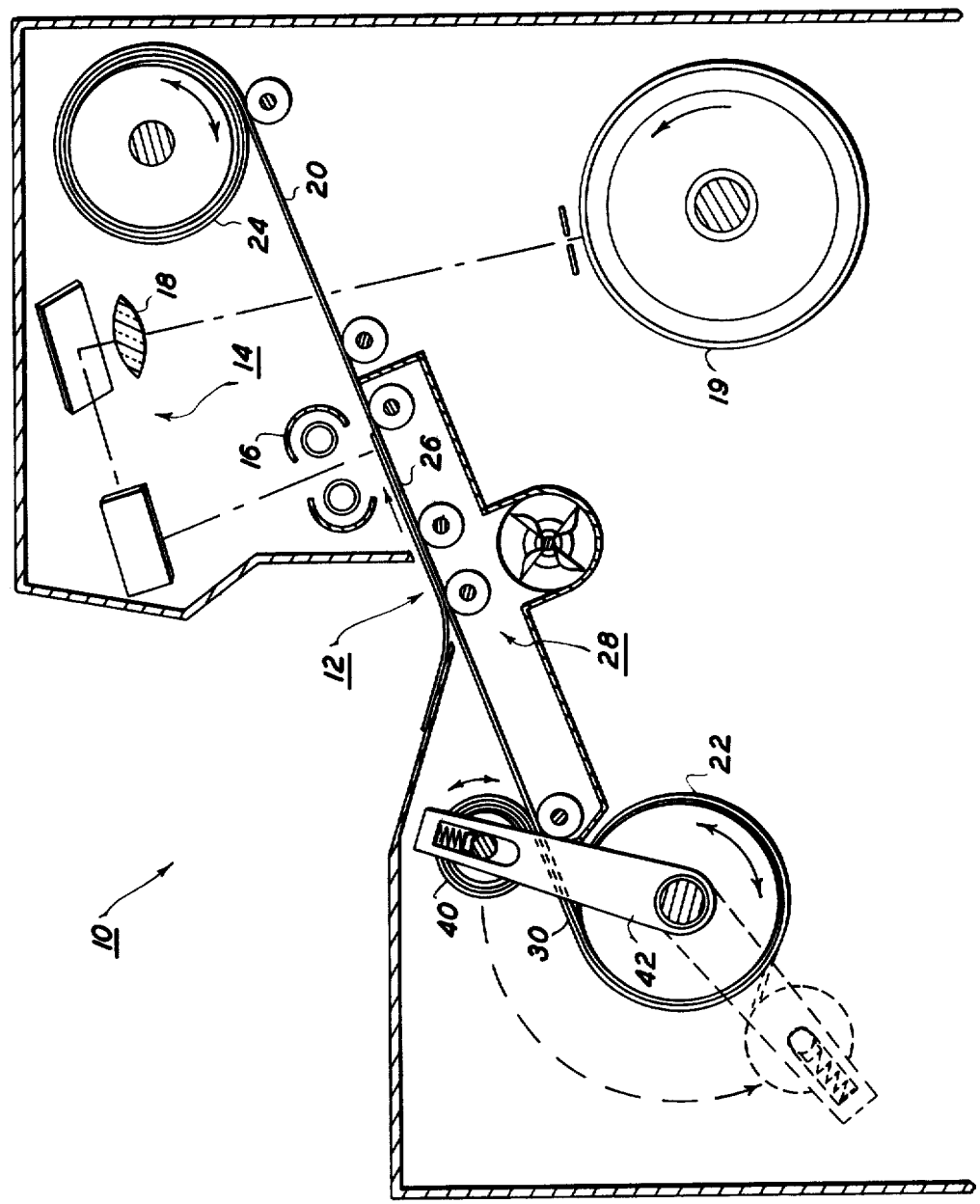

United States Patent [19]

Burkard et al.

[11] 4,053,224
[45] Oct. 11, 1977

[54] DOCUMENT HANDLING SYSTEM

[75] Inventors: Charles M. Burkard, Fairport; Edward C. Bock, Webster, both of N.Y.

[73] Assignee: Xerox Corporation, Stamford, Conn.

[21] Appl. No.: 701,701

[22] Filed: July 1, 1976

[51] Int. Cl.$^2$ .............. G03B 27/62; G03B 27/64; B65H 5/02; B65H 5/04
[52] U.S. Cl. .............................. 355/76; 271/90; 271/273; 355/23
[58] Field of Search ............... 355/3 R, 8, 14, 23, 355/50, 51, 75, 76, 64; 242/67.3 R, 67.4; 271/3, 272, 273, 26, 199

[56] References Cited

U.S. PATENT DOCUMENTS

| 3,452,981 | 7/1969 | Benjamin | 271/199 X |
| 3,960,447 | 6/1976 | Sather | 355/75 |
| 3,963,345 | 6/1976 | Stemmle et al. | 355/50 |
| 3,970,385 | 7/1976 | Kearney et al. | 355/75 |

Primary Examiner—Richard A. Wintercorn

[57] ABSTRACT

A document handling system for making multiple pre-collated copy sheet sets from a set of individual document sheets. The documents are recirculated between a pair of web scrolls and repeatedly imaged on an exposed intermediate web segment extending between the two scrolls. One web scroll is inside wound and above the plane of the intermediate segment, and a second scroll is outside wound and below the plane of the intermediate segment so as to provide unobstructed document loading and unloading access. The documents are retained before and on the second scroll by means of a second web unwound from a third scroll and commonly wound on the second scroll. The third scroll is movable from adjacent the document imaging area to another position in which the two webs separate on the second scroll. The second web does not pass through the document imaging area.

5 Claims, 2 Drawing Figures

DOCUMENT HANDLING SYSTEM

The subject matter of this application is related to that in a commonly assigned U.S. Pat. No. 3,963,345, issued June 15, 1976, to Denis J. Stemmle and Morton Silverberg, entitled, "Pre-collation Copying". Accordingly, the disclosure thereof, and the prior art references cited therein, are incorporated by reference in this application. A contemporaneously filed application by the same Denis J. Stemmle [D/73515Q5] with the same assignee is also noted as directed to similar subject matter.

The present invention relates to document copying systems, and more particularly to a web-scroll document handling system for providing collated copy sheet sets with minimized document handling.

When multiple copies are made from a multi-page set of original documents, the multi-page copies thereof must be separated into separate copy sets in proper order, which is known as collation. For example, for 10 copies of a five page document set the copies should end up in ten separate copy sets, each copy set having one copy of pages 1 through 5 therein, in that order. Once the copies are collated into copy sets they can then be stapled, bound, or otherwise finished. Such a copy set may be a copy of a multiple page memo, report, brief, magazine, book, etc.

The collation of multiple copy sets is known to be performable manually or automatically, in two general ways. In one way, which may be called "post-collation", the original document pages need only be handled once for copying. All of the desired number of copies are made in one copying operation from each document page. The copies thus come out of the reproducer in uncollated form, e.g., 10 copies of paage 1 together, followed by 10 copies of page 2, etc. The post-collation can then be provided in a number of well known ways by mechanical sorters or collators, which separate the copy pages into separate copy set bins. Each copy sheet of a given document page must be individually placed in a separate bin. Then the copy of the next document page must be placed adjacent the preceding copy page in each bin until a copy set is completed in each bin. For such post-collation copying the documents may be automatically serially advanced for copying in a single pass, i.e., without recirculation of the set of documents. It is known to copy documents on a web or webs or from a scroll for such copying, e.g. U.K. Pat. No. 1,111,875, to VEB Reprotechnik Leipzig, and U.S. Pat. Nos. 2,719,714 and 3,452,981.

The conventional post-collation process has a number of disadvantages. It requires considerable mechanical handling of the copy sheets, with consequent potential jams and copy sheet loses. The sorters or collators require considerable space, weight, and expense in order to provide a sufficiently large capacity. A conventional sorter or collator has a maximum copy set capacity limited to the number of its bins. Thus, a conventional single 20 bin sorter can only collate 20 copy sets at a time. To make additional copy sets conventionally all the bins are unloaded after the first copying run is completed and another run made. Also, the maximum size of the copy sets, including the maximum number of copy sheets which can be in each copy set, is limited by the size of the individual bins.

It is known that the use of sorters or collators can be completely avoided by "pre-collation", a different way of performing output collation. In pre-collation the originals are serially recirculated, and one copy made per page per recirculation, by the number of times corresponding to the number of copies desired. Thus, the copy sheets come out of the reproducing apparatus individually, but already pre-collated into order, i.e., in sets. Another term for a pre-collation system is a "document recirculation system", since the documents must be recirculated in some manner in order to allow their repeated sequential copying. Stating it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a 5 page book, one copy at a time would be made of each document page in this order: pages 1, 2, 3, 4, 5; 1, 2, 3, 4, 5, etc., repeated a total of 10 times to make 10 copy sets. For bi-directional pre-collation copying the document copying sequence would be 1, 2, 3, 4, 5; 5, 4, 3, 2, 1; 1, 2, 3, 4, 5, etc..

With pre-collation copying, there is no limit on the number of copy sets. The size of each copy set is limited only by the document page capacity of the document recirculation system. The completed sets can be removed from the output tray and proofed or finished while the others are still being produced. On-line finishing can be provided in which each copy set is bound while the next set is being produced.

In the automatic document handling system for making pre-collated copy sets disclosed herein, and in more detail in the above-cited parent application, the repeated collated imaging of a set of original documents is provided by placing and retaining the documents on an elonage windable document holding web. This web is wound between two spaced web scrolls positioned and wound so as to retain the document between the turns of the web scrolls on both of the scrolls. The web is repeatedly wound and unwound from one scroll to the other (recirculated) to repeatedly expose individual documents on the web in an exposed portion of the web extending between the scrolls. The documents are optically exposed on the web between the scrolls for copying, and a simple optics arrangement may be utilized.

The documents in the presently disclosed system need not contact any other object than the retaining web itself and are held between the layers of the web scroll. They need not be adhesively or otherwise mechaniclly fastened to the web. Thus, there is no substantial relative motion required at any time between a document sheet and any other object, even during recirculation. This reduces the danger of document damage greatly.

In the disclosed system, the advantages of manual initial document placement can be provided. Yet once the documents are placed on the web, all of the subsequent recirculations of the documents for pre-collation copying may be accomplished by the system itself without manual intervention. Further, the unloading of the documents can also be automatically accomplished. Thus, all of the advantages of pre-collatiion copying noted above can be provided, yet with minimization of document handling disadvantages. Further, the present system is readily compatible with various automatic separating and loading systems, and only a single document separating and loading operation need be performed on each document regardless of the number of copies.

As noted above, the size of individual pre-collated copy sets is limited only by the document capacity of the recirculation system. With the system disclosed herein a large number of documents can be recirculated. This number is limited only by the desired or practical maximum dimensions of the web scrolls.

An exemplary embodiment of the present invention is shown and decribed hereinbelow as incorporated into an otherwise conventional exemplary xerographic copying apparatus and process. Accordingly, said known xerographic apparatus and process need not be described in detail herein, since various printed publications, patents, and publicly used machines are available which teach details thereof to those skilled in the art.

The present invention particularly relates to a document handling system of the subject type in which an additional document web is provided for additional retention of the documents between different webs in a desired orientation, but in which the document is fully exposed for copying on only one web, without exposure through any webs, and therefor without optical interference or image contamination from scratches or contaminants on any web.

Figure 2:
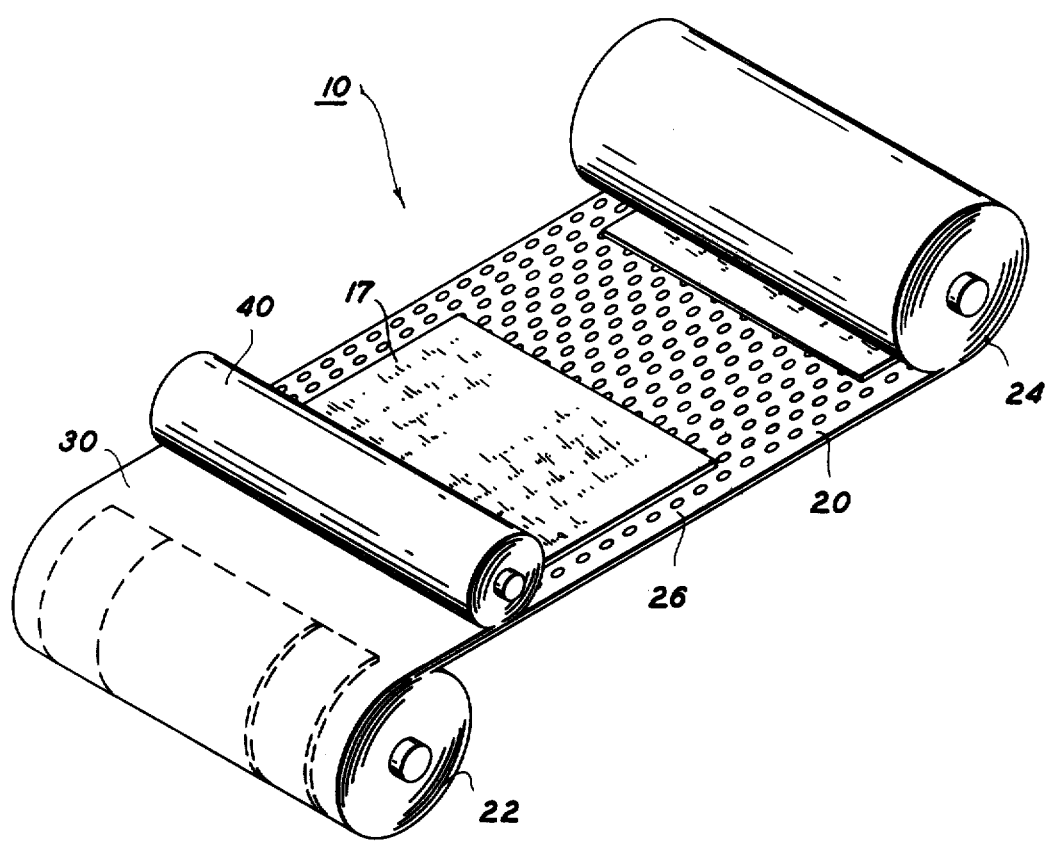

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, which are approximately to scale except where otherwise noted, and wherein:

FIG. 1 is a side view of a xerographic copying system with an exemplary document handling system in accordance with the present invention; and FIG. 2 is a perspective view of the document handling system of FIG. 1.

Referring now to FIGS. 1 and 2, there is illustrated therein one example of the present invention. It will be appreciated that subject document handling systems may have different orientations and combinations with different exemplary xerographic (or other electrostatographic) copying systems, and different output arrangements. For example, the present invention may also be utilized with the other embodiments disclosed in the above-cited U.S. Pat. No. 3,963,345.

In FIG. 1 there is shown a document handling system 10 into which the documents are loaded, contained, and exposed for copying. The documents are inserted into the copier at an input area 12 and carried through the optical path of an optics system 14 integral the copier including an exposure lamp system 16 and a lens 18. The lens 18 focuses the scanned strip image of the document being moved inside the document handling system onto a xerographic photoreceptor 19 for the production of copies of the documents, e.g., document 17 here.

As in the above-cited U.S. Pat. No. 3,963,345, the documents are loaded upon, and automatically recirculated by, an elongate windable document holding first web 20, and means are provided for forming a spaced pair of wound scrolls 22 and 24 from opposite ends of this web 20 for winding up the documents loaded onto the web into these scrolls. The documents are retained between the turns of the web on both of the scrolls during the copying operation. Appropriate or conventional drive means are provided for recirculatingly winding and unwinding the web between one web scroll and the other so as to recirculatingly expose, in sequence, the individual documents on the web as they appear on the unwound intermediate web segment 26. The documents are thereby exposed in the pre-collated order in which they are loaded onto the web, and then in the inverse order, and then again in the same order, and thus correspondingly pre-collated copy sets can be produced by the recirculations between the scrolls. As the documents are loaded they are wound up on the web into one of the scrolls so that the documents are trapped between the web layers of the scroll. Likewise, when the web is recirculated onto the other scroll the documents may be retained in position by being held between the layers of the other scroll. The documents may each be exposed as they are being loaded to provide a "proof set".

In the exposed intermediate web segment 26 between the scrolls the documents may be held in position on the web by providing a web 20 with an air permeable structure and by providing a vacuum platen and vacuum chamber 28 on the opposite side of the web from the document retaining side. The porous web and the exposed document thereon are thereby held against the vacuum platen within the span region of the web between the scrolls. The retaining of the documents on the web 20 in the exposed inter-scroll segment is also assisted by providing a substantially linear and planar configuration of the web between the two scrolls.

The scrolls 22 and 24 illustrated here are wound or convoluted in the same direction, with one scroll 22 being outside wound and the other scroll 24 being inside wound. That is, the intermediate segment 26 of the web 20 forms a document retaining nip on its non-document retaining side with the scroll 22 where the web 26 winds into the scroll 22 while the scroll 24 forms its document retaining side of the web and is wound on the document retaining side of the web. Thus, with only one web 20 the outside wound scroll 22 would beam strip documents therefrom. However, an additional web 30 is provided here so that the documents are continuously maintained on the first or main web 20, on its document retaining side, including within the scroll 22.

Referring to the document retaining web, one example is a thin, flexible, but substantially non-stretching Mylar plastic or other suitable web material, highly perforated over its major central portion to render it air permeable. Its outer edges, at each side thereof, may be driven by driven friction rollers (not shown). The surface of the web provides a high friction surface relative to the document to prevent document movement or sliding on the surface of the web.

At the completion of document loading here all of the documents will have been wound up into one scroll and be retained therein. To make any desired number of copy sets the operator merely selects appropriate conventional switches to initiate the copying automatically. The web is repeatedly recirculatingly wound and unwound between the scrolls by the number of times corresponding to the number of copy sets desired. On each copying recirculation the entire series of documents is moved past the imaging area on the web and individually copied.

The copying is done here with line scanning or flowing light strip imaging system so as to provide document image movement in the same direction as the photoreceptor drum movement direction. To avoid a high speed rewind to rewind the web back from one scroll onto the other scroll before each web copying run, bi-directional scanning may be provided by inserting an appropriate known optical system in the optics path to optically reverse the apparent scanning direction on alternate web direction movements.

A complete individual pre-collated copy set is produced from each recirculation of the web between the scrolls carrying the documents thereon, without requiring a collator or sorter. As previously described in the introduction, the operator may provide on-line stapling or other finishing either automatically or manually while the machine is continuing to make the subsequent copy sets automatically.

The documents are supported solely by the webs and do not need to contact any other structure during their recirculation and copying.

The extent or length of the reciprocal winding and unwinding of the web between the two scrolls will vary depending on the number of documents being copied, their dimensions, and the spacing which is provided between documents on the web. The machine logic may record the length of web utilized in loading the given number of documents, so that the web need only be recirculatingly driven by this length for each copy set.

Referring now in greater detail to the function and inter-relation of the second web 30 to the first web 20, it may be seen that the second web 30 combines with the first web 20 to provide an overlapping, commonly wound sandwich for positively retaining the documents between the two webs at all times, on only the scroll 22. The two webs normally remain sandwiched together for retaining the documents without slippage as both webs unwind from the two scrolls, and for a substantial distance thereafter directly up to the edges of the minor central portion of the intermediate web segment 26 on which the documents are imaged. However, in the imaging area, the document is retained and guided only on the single first web 20. The second web 30 does not cross over or pass through the imaging area or interfere with the document imaging in any way. The document is imaged totally unobstructed. Neither the image, or the illumination light for forming the images, passes through either of the webs. Thus, paper lint, scratches, wear marks or contaminants do not interfere in any way with the image or the illumination of the documents. This also eliminates any need for an elaborate cleaning or frequent replacement of either of the webs. These imaging advantages are known from the prior art, e.g., the U.S. Pat. Nos. 2,719,714 and 3,452,981, noted above teaching endless (non-scroll) document belts imaging opposite sides of documents at each side of an imaging area and retaining the document for imaging.

With the arrangement provided here, only a single second web 30 is required, and a single additional web scroll 40. The document is retained between the two webs at one side of the optical imaging area, yet is retained and recirculated on one web 20 at all times. This is accomplished with the web separating and guiding arrangement for the second web 30 provided here.

As the two webs commonly unwind from the outside wound scroll 22, they travel together under tension to transport the document directly into the imaging area, until they reach the third scroll 40, which is normally positioned at one side of the intermediate segment 26 directly overlying the document side of the web 20. The sandwiched wrapping and unwrapping of the documents between two webs 20 and 30 controls buckling or slippage of the documents therefrom. As the second web 30 reaches the separating scroll 40 it sharply wraps up around this scroll 40 away from the web 20 to avoid the optical path area.

In the direction of belt movement in which the first web 20 winds up in the inside wound scroll 24 the documents are captured in the nip between the web 20 and the scroll 24 and wrapped up within the turns of the first web 20 without any other retention being required. However, in the other direction of recirculating motion of the first web 20 the document retaining side of the web 20 wraps around the outside of the web scroll 22. Thus, to prevent automatic beam stripping of the documents, the third web scroll 40 is positioned in its illustrated solid line position to unwrap the second web 30 onto the first web 20 before the scroll 22 is reached by the first web 20. This sandwiches the documents between the two webs prior to their being wrapped on the scroll 22 to provide positive retention of the documents between the two webs on the scroll 22.

A significant advantage of the present arrangement is that the outside wound scroll 22 may be positioned below the plane of the planar intermediate web segment 26. This allows a much less obstructed and lower input area 12 for the loading of documents onto the immediate web segment 26. This is in comparison to the arrangements in the above-cited U.S. Pat. No. 3,963,345 in which the web scrolls are on the same side of the, i.e., both positioned above, the intermediate web segment. The third scroll 40 here is substantially smaller in diameter at all times than the scroll 22, since the third scroll 40 winds only the second web 30 thereon, and no documents. Further, the second web 30 can be of a different material since it does not need to be vacuum apertured or otherwise specifically adapted for the maintenance of documents thereon for copying. The smaller scroll 40 may be spaced from the intermediate web segment 26 or imaging area without causing a large vertical obstruction above the imaging area which would impede loading or unloading of documents.

The third scroll 40 here is movable entirely out of the way to a position completely below the intermediate web segment 26 and below the axis of the scroll 22, as shown by the dashed movement arrow and the dashed line position of the scroll 40 and the pivotable mounting arm 42 thereof by which the scroll 40 may be rotated about the scroll 22. This allows complete access at the plane of the intermediate web segment 26 of the first web 20. This rotation of the third web scroll 40 also provides at least two different separation points between the first and second webs. These two different separation points can provide different functions in regard to the documents on the first web 20. In the normal position of the scroll 40, illustrated by its solid line position, the first and second webs separate adjacent the intermediate segment of the first web, substantially after the two webs have unwound together from the second scroll 22. This provides for document copying without stripping of the documents from the first web 20. In the second illustrated position of the scroll 40 the two webs 20 and 30 separate from one another at a different position, on the scroll 22 itself, at a position in which the first web 20 is still wound on the scroll 22. Thus, documents being transported on the first web 20 toward the scroll 22 will tend to automatically strip off by the curvature of the web 20 around a first portion of the scroll 22 before reaching the nip between the two webs. Thus, automatic document stripping can be provided with this arrangement for automatically unloading the documents from the web 20 at the upper portion of the scroll 22 where the web 20 first begins to wind onto the scroll 22. With this arrangement the axes of the two scrolls 22 and 24 may be fixed and no movement of either of these two main scrolls is required for the document loading or the unloading of documents from the web 20. In no position of the scroll 40 is the second web 30 allowed to pass through or otherwise interfere with the optical imaging area for the documents or the document input area 12.

The curling of the documents in opposite directions by the scrolls 22 and 24 respectively on recirculation tends to remove the "curl memory" of the document sheets. This assists in document unloading. This is a particular problem with heavy sheets.

It may be seen that there has been disclosed herein an embodiment of a document handling system for a copying apparatus for making multiple pre-collated copy sheet sets with a high level of document protection and minimal document handling and ease of document loading therein. While the embodiment disclosed herein is presently considered to be preferred, it will be appreciated that numerous modifications and improvements may be made therein without departing from the true spirit and scope of the invention. The following claims are intended to encompass all such modifications and improvements as fall within the spirit and scope of the invention.

What is claimed is:

1. In an automatic handling system of a copying apparatus for making pre-collated copy sheet sets by repeated collated imaging of a set of original document sheets, the improvement comprising:

an elongated windable document holding first web with a document side thereof being adapted for supporting said imaging documents thereon;

first web scroll means wound from one end of said first web and inside wound from said document side for winding up a set of otherwise unattached documents on only said first web into said first scroll means and for retaining the documents between the turns of only said first web in said first scroll means;

second web scroll means wound from the opposite end of said first web, said second scroll means being outside wound, in the same winding direction as said first scroll means;

a second elongated windable document retaining web;

said second web being commonly interleavingly wound with said first web on only said second web scroll means from one end of said second web to retain documents in said second scroll means between turns of said first and second webs;

means for winding a third web scroll from the opposite end of said second web;

said first web having a minor intermediate unwound exposed segment extending between said first and second scroll means for the imaging of documents on said first web;

means for recirculatingly winding and unwinding said first web between said first web scroll means and second web scroll means to recirculatingly expose individual documents on said intermediate segment of said first web between said first and second web scroll means in a pre-collated order;

optical imaging means for imaging documents on said intermediate segment of said first web between said first and second web scroll means for copying of said documents in a pre-collated order;

said second web normally merging with said document supporting side of said first web between said intermediate segment and said second scroll means, but separating from said first web before said intermediate segment so that documents are not imaged through said second web by said optical imaging means.

2. The document handling system of claim 1, wherein said intermediate segment of said first web is generally planar, and wherein said first and second web scroll means are positioned at opposite sides of said intermediate segment, and wherein said third scroll is spaced from said intermediate segment of said web to provide loading access to said intermediate segment for loading documents thereon.

3. The document handling system of claim 2, including means for moving said third web scroll relative to said second web scroll means and away from said intermediate segment for unobstructed document loading access to said intermediate segment.

4. The document handling system of claim 3, wherein said means for moving said third web scroll provides two positions thereof wherein said first and second webs separate from one another at a first position adjacent said intermediate segment after unwinding from said second scroll for document copying, and separate from one another at a second position in which said first web is still wound in said second scroll for document unloading.

5. The document handling system of claim 1, wherein said third scroll is always substantially smaller than said second scroll means.

* * * * *